US005714243A

United States Patent [19]

Mammino et al.

[11] Patent Number: 5,714,243

[45] Date of Patent: Feb. 3, 1998

[54] DIELECTRIC IMAGE RECEIVING MEMBER

[75] Inventors: Joseph Mammino, Penfield; Donald J. Teney, Rochester; Dennis A. Abramsohn; Santokh S. Badesha, both of Pittsford; Donald S. Sypula, Penfield, all of N.Y.

[73] Assignee: Xerox Corporation, Stamford, Conn.

[21] Appl. No.: 385,484

[22] Filed: Feb. 8, 1995

Related U.S. Application Data

[63] Continuation-in-part of Ser. No. 43,050, Apr. 5, 1993, abandoned, which is a continuation of Ser. No. 625,982, Dec. 10, 1990, abandoned.

[51] Int. Cl.[6] .......... B32B 3/00

[52] U.S. Cl. .......... 428/306.6; 427/447; 427/454; 427/450; 427/452; 427/453; 428/304.4

[58] Field of Search .......... 427/450, 447, 427/451, 452, 453, 454, 126.4; 347/125, 155; 492/53; 428/306.6, 304.4

[56] References Cited

U.S. PATENT DOCUMENTS

| | | | |
|---|---|---|---|
| 3,337,309 | 8/1967 | Lewis et al. | 29/183.5 |
| 4,055,705 | 10/1977 | Stecura et al. | 428/633 |
| 4,106,782 | 8/1978 | Hyde et al. | 277/235 |
| 4,248,440 | 2/1981 | McCormick | 277/224 |
| 4,267,556 | 5/1981 | Fotland et al. | 346/153.1 |
| 4,396,661 | 8/1983 | George et al. | 428/90 |
| 4,402,888 | 9/1983 | Runck | 264/22 |
| 4,410,584 | 10/1983 | Toba et al. | 428/215 |
| 4,569,895 | 2/1986 | Willett et al. | 430/70 |
| 4,599,270 | 7/1986 | Rangaswamy et al. | 428/402 |
| 4,619,515 | 10/1986 | Maczuszenko et al. | 355/3 |
| 4,645,716 | 2/1987 | Harrington et al. | 428/472 |
| 4,675,204 | 6/1987 | Nicoll et al. | 427/35 |
| 4,804,607 | 2/1989 | Atsumi | 430/67 |
| 4,835,022 | 5/1989 | Hühne | 427/423 |
| 4,839,239 | 6/1989 | Ducos et al. | 428/623 |
| 4,864,331 | 9/1989 | Boyer et al. | 346/159 |
| 5,039,598 | 8/1991 | Abramsohn et al. | 430/347 |

FOREIGN PATENT DOCUMENTS

| | | |
|---|---|---|
| 0 166 097 | 1/1986 | European Pat. Off. . |

*Primary Examiner*—Katherine A. Bareford
*Attorney, Agent, or Firm*—Kenyon & Kenyon

[57] ABSTRACT

A dielectric image receiving member is disclosed which comprises a substrate layer, a porous plasma-sprayed dielectric layer formed on the surface of the substrate layer, and a dielectric polymeric coating material filling at least those pores opening at the surface of the oxide layer. Most preferably, the plasma-sprayed layer is a metal oxide and the coating material is a glass resin.

17 Claims, 2 Drawing Sheets

DIELECTRIC IMAGE RECEIVING MEMBER

This is a continuation-in-part of U.S. Ser. No. 08/043,050, filed Apr. 5, 1993, now abandoned, which is a continuation of U.S. Ser. No. 07/625,982, filed Dec. 10, 1990, now abandoned.

FIELD OF THE INVENTION

The present invention relates to dielectric image receiving members useful for ionographic imaging processes, particularly to dielectric image receiving members having surface coatings to improve their dielectric and other performance characteristics.

BACKGROUND OF THE INVENTION

In typical ionographic reprographic procedures a latent charged image is formed on a dielectric charge receiver (i.e., a dielectric image receiving member). The latent charged image is typically formed by various techniques such as by an ion stream (ionography), stylus, shaped electrode, and the like. The uniformity of the final image from this process depends directly on the uniformity of the dielectric thickness of the charge receiver and on its ability to maintain the latent image from the image step to the development step without loss of resolution due to lateral charge movement. Typically, the latent image is then developed by application of an oppositely-charged toner material which adheres to the charged latent image, and the toner material is then transferred to an intermediate member or to the desired final medium for the final image, such as paper. This is normally accomplished by applying an attractive electric field opposite in sign to the toner material, thus attracting the toner particles which have adhered to the latent image on the dielectric imaging member (or to the intermediate transfer member), and transferring them to the final medium. Once the toner particles are transferred to the final medium they are normally fixed by applying either heat, pressure, solvent vapor and/or other chemical cure or the like. After transfer of the developed image, the surface of the receiving member is typically cleaned by scraping with a blade or brushing with a cylindrical fiber brush to remove toner particles and other debris which remains after the transfer process.

Dielectric charge receivers traditionally include a cylindrical drum or belt made from a non-magnetic conductive material which is coated with a dielectric material. Dielectric charge receivers coated with polymeric materials are described in U.S. Pat. No. 5,073,434 to Frank, et. al. and the process using such receivers are described in U.S. Pat. No. 5,153,618 to Frank, et. al., the disclosures of which are incorporated herein by reference.

Metal oxide materials are sometimes used as dielectric materials due to their superior hardness and resistance to abrasion and wear during extended use. Plasma spraying deposition techniques have been used to apply oxide layers to dielectric charge receivers. Although these deposition techniques tend to provide a thicker and harder oxide layer than other techniques such as anodization, these techniques also produce relatively porous surfaces which tend to retain toner particles after transfer of the developed image to the final image receiving medium. Retention of toner particles can cause the receiver to become laterally conductive and, therefore, incapable of adequately retaining a charged image.

Boyer et al. (U.S. Pat. No. 4,864,331) disclose a dielectric image receiving member in which a porous metal oxide layer is plasma sprayed onto a substrate layer and then coated and filled with waxes, such as Carnauba wax, and metal salts of fatty acids, such as zinc stearate and iron tristearate. See column 2, lines 40–43, and column 6, lines 9–12. However, these materials provide a coating which is not resistant to abrasion during cleaning of the receiving member. In particular, we have found that whenever a blade is used to clean the surface of the image receiving member, the sealing materials employed by Boyer et al. are abraded relatively easily, reopening the pores in the metal oxide layer. Brush cleaning also abrades the sealing materials and acts to scoop sealing material out of the pores.

In addition to being susceptible to mechanical damage, we have also found that the coatings disclosed by Boyer are rapidly degraded by liquid carriers that are typically used in liquid xerographic systems. These liquid carriers dissolve and remove the coatings of Boyer, resulting in contamination problems and preventing reuse of the ink which has contacted the dielectric image receiving member.

The mechanical or chemical deterioration of the coating over the metal oxide layer of the receivers of Boyer et al. is a significant disadvantage for use of such receivers over extended periods of time for imaging applications, because toner particles are retained in the opened pores of the receiver.

No other dielectric image receiving members are known by the inventors wherein a plasma sprayed oxide layer is coated with a wax or any other organic compound.

Imaging is not the only application for plasma-sprayed dielectric layers. For example, plasma or flame sprayed ceramics filled with high dielectric strength polymers have been adapted as ground electrodes for the corona treatment of polymeric films. In U.S. Pat. No. 4,402,888 to Runck, a roll with a metallic substrate and a polymer-filled dielectric coating serves as a ground electrode for a process by which a small metal electrode is used to create a corona through which the film passes.

The ground electrode of Runck has a porous refractory oxide dielectric coating of a thickness in the range of from about 0.02 inches (20 mils) to about 0.05 inches (50 mils) or more. See Runck, Column 4, lines 20–21. The pores within the coating are substantially completely filled with polymeric material (column 3, lines 52–54). The design objectives for the ground electrode in Runck are high thermal conductivity, high dielectric strength, and resistance to localized electrical breakdown and cracking (column 5, lines 40–49). While all of these properties are desirable in an apparatus for the bulk treatment of polymeric films, not one is of concern for dielectric receivers for ionographic reproduction. Hence, key features of the Runck electrode differ significantly from those of the present invention.

The ground electrode of Runck is unsuitable for use as a dielectric image receiving member for the following reasons. First, the physical thickness of the dielectric layer in Runck (20 to 50 mils or larger) would have to be reduced to at most 15 mils to support a latent charged image in typical ionographic reprographic systems (for which the ground electrode in Runck is not designed). If attempted to be used as a dielectric receiving member, the thicker layer of Runck would result in higher voltages on the surface per unit charge present thereon, resulting in "blooming", an undesirable broadening of lines and solids in the image as charges on the surface interact with new charges being deposited on the surface, deflecting them from their intended positions.

Another feature rendering the Runck ground electrode unsuitable for ionic reprographics is the variation in the thickness of the oxide layer. Variations in the physical thickness of the dielectric layer adversely affect its dielectric thickness. First, Runck uses a larger grit size (i.e., 36 to 46 grit, which is on the order of 10 to 20 mils) for roughening the substrate surface to improve adherence of the oxide layer. Also contributing to variations in thickness is the relatively large size of the particles used to constitute the dielectric layer. Runck's aluminum oxide particles range from 25 to 45 microns. Such particles result in additional variation in the thickness of the dielectric layer, reducing the resolution attainable for imaging purposes. If used in connection with an imaging electrode (which requires an oxide layer of 15 mils or less) the combination of the large grit size and the large aluminum oxide particles used in Runck would result in an oxide layer that exceeds the less than ±5% thickness variation required for imaging applications.

In view of the above, it would be desirable to provide a dielectric image receiving member which provides a plasma sprayed and filled dielectric layer with a durable surface and with electrical characteristics that are appropriate for imaging applications.

SUMMARY OF THE INVENTION

The above and other needs are met by the dielectric image receiving members of the present invention which comprise a substrate layer, a plasma-sprayed dielectric layer formed on the surface of the substrate layer, and a polymeric coating material filling at least those pores at the surface of the oxide layer that is suitable for ionic reprographic imaging applications. The coating material can either be applied after the plasma-sprayed layer or applied during the plasma spraying.

According to an embodiment of the invention, a dielectric image receiving member is provided that comprises a substrate layer, a porous plasma-sprayed dielectric layer formed on the surface of the substrate layer, and a durable dielectric polymeric coating material filling at least pores opening at the surface of the plasma-sprayed layer. The porous plasma-sprayed dielectric layer ranges in thickness from about 0.001 inch to about 0.015 inch and has a thickness variation of less than ±5%. This dielectric image receiving member has a voltage uniformity of less than about ±5% at 800 volts.

According to another embodiment of the invention, the above dielectric image receiving member is used to form an image by forming a latent electrostatic image on the dielectric image receiving member, developing the latent electrostatic image, and transferring the developed image to a final image carrier.

The systems used to develop an image on such members are typical to all liquid and dry charged image techniques, such as dry Xerography.

The level of the surface voltage determines the level of toner development, and therefore the uniformity of surface voltage determines the uniformity of toner development. The uniformity of the dielectric thickness is extremely important in maintaining the uniformity of surface voltage in the ionographic imaging process. The dielectric receiving members of the present invention exhibit uniform dielectric thickness as well as good retention of their uniform dielectric character. Variations in dielectric thickness range narrowly across the dielectric (i.e., they are less than ±5%, more preferably less than ±3%).

Moreover, the electric fields and dielectric spacings are all chosen to be well below air breakdown thresholds, and to avoid localized electrical breakdown. Very low charge levels are utilized in the typical imaging process, producing electric fields for development of between about 0.1 and 10 volts per micron and preferably between about 1 and 4 volts per micron. This is significantly less than the voltages that would typically cause the dielectric breakdown of materials, which is generally from about 50 to about 100 volts per micron.

It should also be noted that the imaging and development stages of the process are usually run at ambient or at slightly elevated temperatures and are generally not threatened by the excessive accumulation of heat. Therefore, the thermal conductivity properties and electrical breakdown of the dielectric receiver are not an important design consideration in the imaging process.

The dielectric image receiving members of the present invention provide surfaces which are more durable than those found in the prior art. As a result, the dielectric receiving members of the present invention withstand extended exposure to surface cleaning blades and brushes. The surfaces of the members are also impervious to hydrocarbons and other liquid ink development carriers used in liquid electrostatographic systems. The surfaces provide excellent image receivers in systems using liquid developers.

Lateral conductivity of the coating is the ability of imagewise charges from charged areas to move to uncharged areas. These laterally displaced charges cause development in areas that are not intentionally imaged. This can occur if the material of the coating becomes conductive for any reason. For example, as noted above, this can occur if the development/cleaning process opens pores in the plasma sprayed layer which become filled with toner and thus become laterally conductive. The surfaces provided by the present invention are impervious to hydrocarbons and other liquid ink development carriers and provide excellent image receivers for liquid developers. The surfaces of the present invention also resist abrasion and pores remain filled during cleaning to prevent the buildup of trapped toner which would increase lateral conductivity. The lateral conductivities of the present invention are very low, exhibiting lateral resistivities ranging preferably from about $10^8$ Ω/square or higher, more preferably from $10^9$ Ω/square or higher, and most preferably from $10^{10}$ Ω/square or higher.

Thus, the preferred embodiment of this invention provides a dielectric thickness uniformity for the surface coating that enables a uniform imaging process and further eliminates the damage during liquid development and/or cleaning that might allow for lateral conductivity to decrease image integrity.

DESCRIPTION OF PREFERRED EMBODIMENTS

Figure 1:
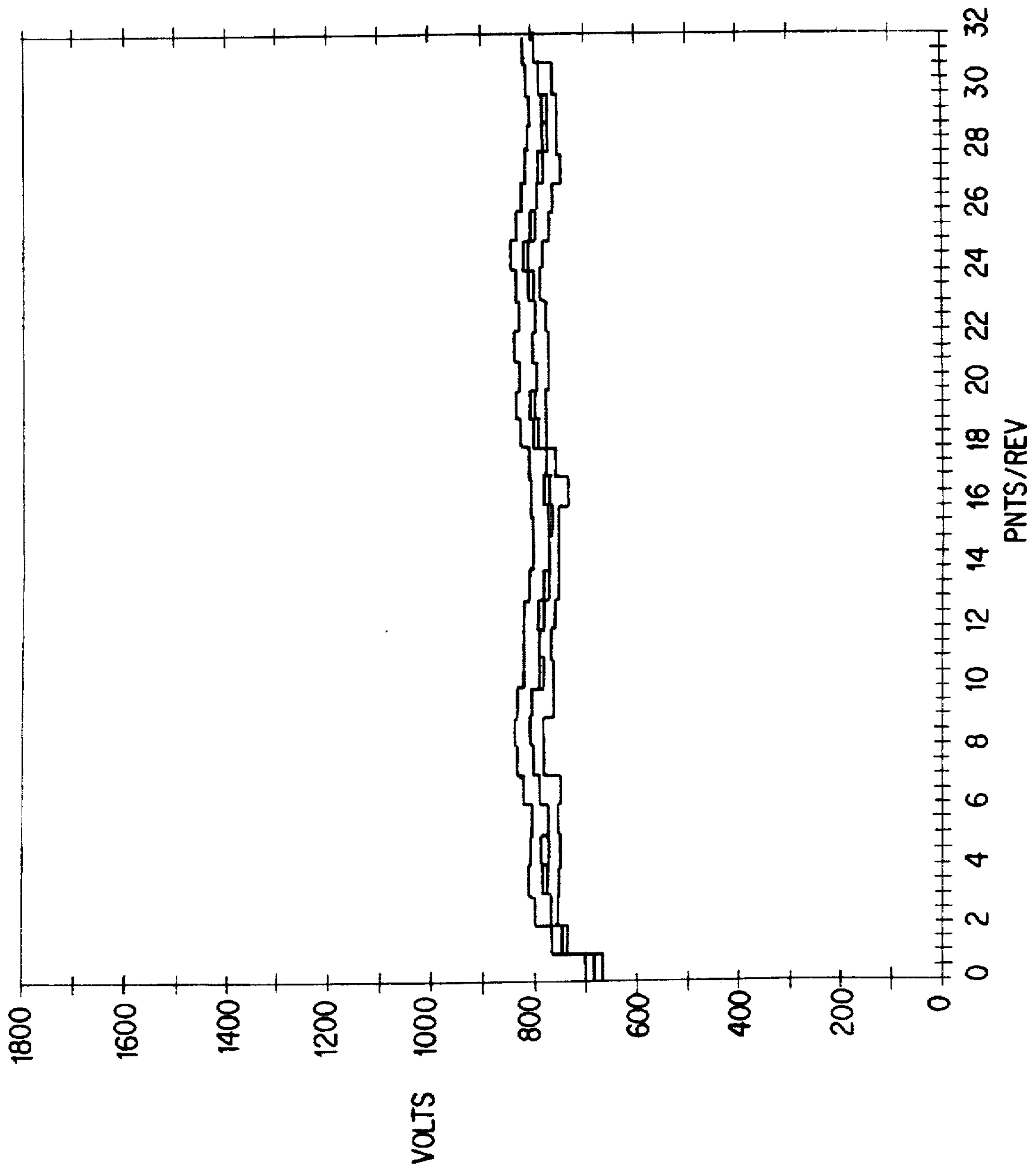
FIG. 1 is a graph summarizing surface voltage data that are uniform to within ±1.5% for an image receiving member according to an embodiment of the present invention having an aluminum oxide layer coated with a glass resin.

Plasma spraying is a well known coating technique in which the material to be coated is heated in a powdered form to near or above its melting point and is then sprayed onto the surface of a substrate to be coated by a plasma gas stream.

A standard technique for improving the adherence of the plasma sprayed layer involves roughening the surface of the substrate. A preferred technique for the practice of the present invention is grit blasting the surface to a very slight roughness preferably ranging from 200 to 500 microinches rms, more preferably from 200 to 300 microinches rms. This very slight roughness is suitable for a dielectric charge receiving surface that can be used for reprographic purposes.

Once the substrate surface is prepared, the dielectric layer is plasma sprayed onto the substrate surface using well-known techniques. These techniques are described in more detail in R. F. Bunshah et al., *Deposition Technologies for Films and Coatings*, "Plasma and Detonation Gun Deposition Techniques and Coating Properties", pp. 454–465 (1982), which is incorporated herein by reference.

The plasma-sprayed dielectric layer is preferably a metal oxide which can be applied by plasma spraying and which will provide the desired dielectric properties. Preferably the metal oxide is selected from the group consisting of aluminum oxide (e.g., $Al_2O_3$), zirconium oxide (e.g., $ZrO_2$), titanium oxide (e.g., $TiO_2$), and mixtures thereof. The most preferred single metal oxide is aluminum oxide. Preferred oxide mixtures are mixtures of aluminum oxide, more preferably mixtures of aluminum oxide and zirconium oxide or titanium oxide, and most preferably mixtures of aluminum oxide and titanium oxide. This last mixture preferably comprises more aluminum oxide than titanium dioxide, more preferably from about 60 to about 95 parts aluminum oxide to 5 to 40 parts titanium dioxide, even more preferably from about 82 to 92 parts aluminum oxide to about 8 to 18 parts titanium dioxide, and most preferably about 87 parts aluminum oxide to about 13 parts titanium oxide. The metal oxide preferably has a bulk electrical resistivity of at least $10^{11}$ ohm-cm. The particle size of the aluminum oxide preferably ranges from about 0.05 to 20 microns, more preferably from about 0.1 to 15 microns, and most preferably from about 0.1 to 1.5 microns. This particle size results in a smooth surface for the dielectric layer, capable of receiving latent electrostatic images with good resolution for reprographic purposes.

Other materials for the plasma-sprayed dielectric layer include suitable materials which have the desired hardness and dielectric properties. Such materials include oxides, nitrides, carbides and silicates, such as $Y_2O_3$, BN, $Si_3N_4$, $CeO_2$, $ZrSiO_4$, MgO, $TiB_2$, $HfO_2$, $Sm_2O_3$, $MoSi_2$, SiC, mixtures thereof, and the like. Suitable materials are available from several vendors, including Cerac, Inc., Milwaukee, Wis.

The range of available thicknesses for the oxide layer applied by plasma spraying range from 0.001 inches (1 mil) to 0.250 inches (250 mils). The oxide layers of the present invention, however, must be no greater than 15 mils, and are preferably 1 mil to 15 mils, more preferably from 2 mils to 10 mils, and most preferably from 2 mils to 5 mils. In certain embodiments the metal oxide layer is ground or polished to achieve a roughness preferably from about 2 to 30 microinches rms, more preferably from about 2 to 8 microinches rms, and most preferably from about 2 to 5 microinches rms.

A durable polymeric material is either plasma sprayed upon the roughened substrate along with the dielectric material, or else it is applied to the dielectric layer after the layer has been deposited. If applied after the layer has been deposited, the coated material may coat the surface of the layer as well as fill the pores. If so, the coating thickness is preferably less than about 1 mil, more preferably less than about 0.5 mil. A durable material is defined herein as being a material that can withstand the abrasion of brushes and cleaning blades currently used in ionographic reprographic devices and withstand the solvent effects of hydrocarbons and other liquid ink development carriers.

Suitable polymeric coating materials include acrylics, polyurethane, polyesters, fluorocarbon polymers, polycarbonates, polyarylethers, polyaryl sulfones, polybutadiene and copolymers of styrene, vinyl/toluene, acrylates, polyether sulfones, polyimides, poly (amide-imides), polyetherimides, polystyrene and acrylonitrile copolymers, alkyds, cellulosic resins and polymers, nylon and other polyamides, phenolic resins, phenylene oxide, polyvinylidene fluoride, polyvinylfluoride, polybutylene, polycarbonate co-esters, and the like. Preferably the polymeric coating material is selected from the group consisting of a polyesters, acrylics, polyimides, and silicones.

Most preferably the polymeric coating materials are silicones, particularly silicone hard coats. Silicone materials which may be used in the present invention include silicone-silica hybrid polymers disclosed in U.S. Pat. No. 4,770,963; dispersions of colloidal silica and hydroxylated silesquixone in alcoholic media disclosed in U.S. Pat. No. 4,565,760; cross-linked siloxanol-colloidal silica hybrid materials disclosed in U.S. Pat. No. 4,439,509; and silicone hard coat materials that are available (e.g. Silicone Hard Coatings from General Electric Co., Silvue Abrasion Resistant Coatings from SDC Coatings, and GR 651 from OI-NEG TV Products, Inc.) The relevant disclosure of the above patents is hereby incorporated by reference. Silicone hard coat materials are sometimes referred to as cross-linkable siloxane-colloidal silica hybrid materials, being characterized as dispersions of colloidal silica and a partial condensate of asilanol in an alcohol/water media. Once coated and dried, these materials are often referred to as glass resins. Preferably, the silicon hard coat materials do not contain silica, since silica tends to attract moisture which may affect conductivity.

The polymeric coating material is applied in any manner suitable to the specific material which will allow the material to fill in and seal pores in the plasma sprayed metal oxide surface and include without limitation spray coating, dip coating, flow coating, contact roll coating, and so forth applied under ambient temperature, humidity or atmospheric conditions, in conditioned environments (e.g., heated, solvent saturated), or in vacuum. The coating material can be applied simultaneously with the metal oxide during the plasma spraying step in certain embodiments.

Surfaces made in accordance with the present invention can also be ground and/or lapped to the desired thickness before use. The surface roughness of the polymeric coating material is preferably from 1 to 30 microinches rms, more preferably from 1 to 8 microinches rms, and most preferably from 1 to 5 microinches rms.

The uniformity of a final image from a process utilizing such a dielectric image receiving member depends directly on the uniformity of the combined dielectric thickness of the oxide layer and the polymeric coating material embedded therein. The polymeric coating and the material for the plasma-sprayed dielectric layer can be selected and applied according to the present invention to produce a combined dielectric constant and dielectric thickness uniformity that enables excellent printing when used in an ionographic imaging system. In order to best carry out its imaging function, the final thickness of the dielectric together with the polymer is preferably from 1 to 15.5 mils, more preferably from 2 to 10.5 mils, and most preferably from 2 to 5.5 mils. The thickness variation of the image member can be less than ±2% and the voltage uniformity can be better than ±2%.

Preferred embodiments of the present invention are described by the following examples which are illustrative of the invention and are not intended to limit the invention as stated in the appended claims.

EXAMPLE 1

An aluminum drum was coated with aluminum oxide ($Al_2O_3$) plasma spraying. The characteristics of the coating material were as follows: 99.5% aluminum oxide; hardness (Rockwell): Rn15 83–86, Rc 60–65; bond strength (psi) 2625 tapered, 4760 cylindrical; density (g/cc): 3.44 (apparent), 3.31 (bulk); surface finish (rms, microinches): 100–135 (sprayed), 6–10 (ground); melting point: 3722 F. The oxide was applied to a thickness of 10 mils.

The oxide surface was then coated with a glass resin [GR 651, commercially available from Owens-Ill., OI-NEG TV Products, Inc., Toledo, Ohio (a methylpolysiloxane polymer solution in ethanol-butanol solvent)] by contact roll coating as follows: 3 drops of 3-aminopropyltriethoxysilane was added to approximately 30 ml of the resin as received from the supplier. The oxide coated image receiving member was mounted such that it was parallel to and in contact with a similar size aluminum roll which had a covering that consisted of a polypropylene sleeve. The resin mixture was then poured into the nip formed between the aluminum oxide coated drum and the polypropylene covered metal roll, which were allowed to rotate in contact for several minutes to uniformly distribute the resin composition. The excess resin material was then removed by wiping it from the polypropylene covered metal roll. The resin filled the pores in the metal oxide layer to give a smooth surface on the image receiving member.

The drum and roll were then separated and the glass resin set up slowly in about 10 to 15 minutes, giving a good surface. The solvent was allowed to evaporate at room temperature for 17 hours and at 50° C. for 64 hours. The glass resin was then completely dried of solvent and fully cured by heating at 180° C. for 40 minutes. The resulting image receiver member had a smooth surface of less than 10 microinches rms and an aluminum oxide layer with pores filled with glass resin.

Figure 2:
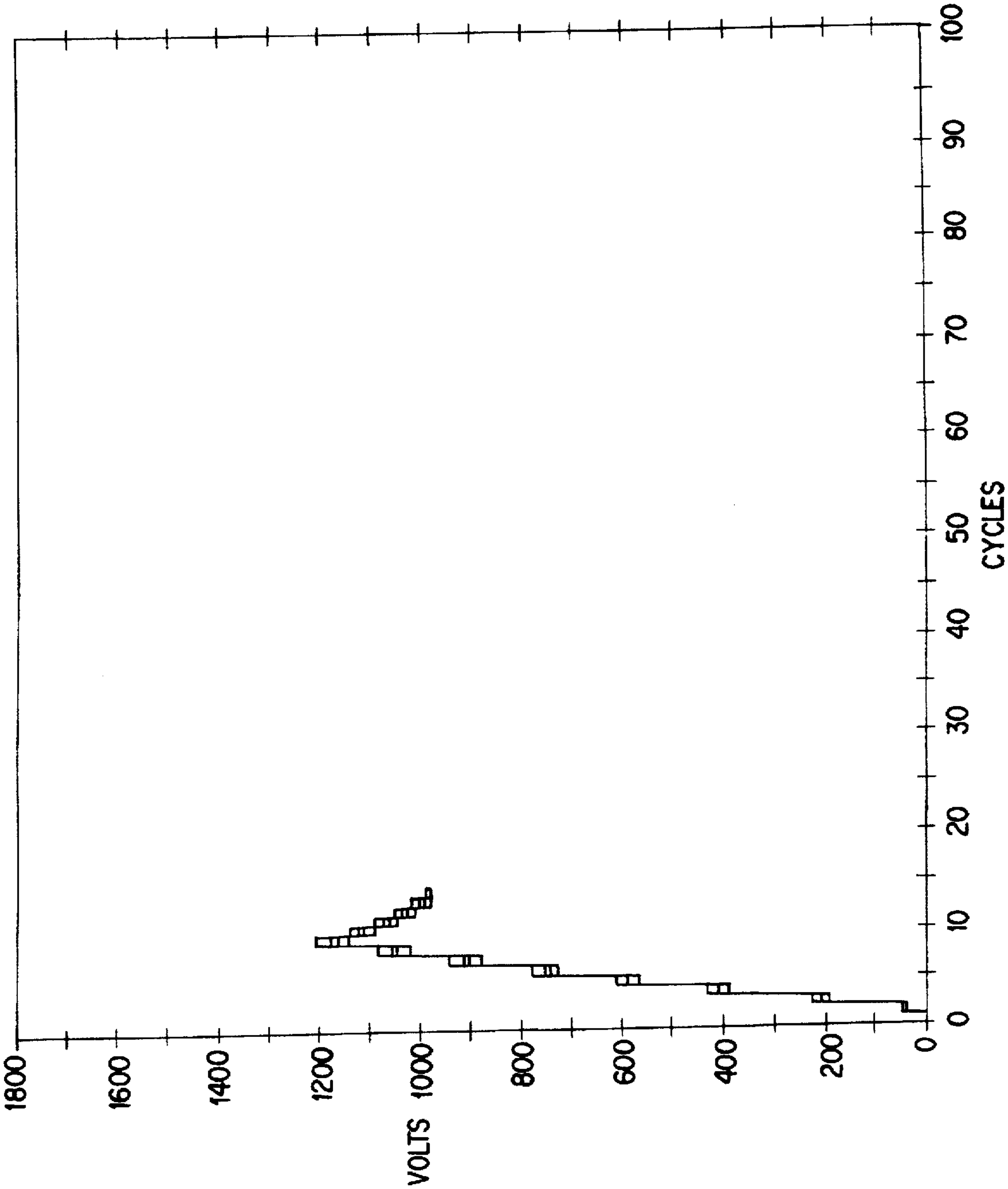
FIG. 2 is a graph summarizing dielectric constant data, voltage retention and charge decay with respect to an image receiving member according to an embodiment of the present invention having an aluminum oxide layer coated with a glass resin.

Testing of the resulting charge receiver produced the data summarized in FIGS. 1 and 2. The coated charge receiver exhibited surface voltage uniformity of plus or minus 1.5% and a low voltage decay, indicating that the resulting surface was an effective dielectric receiver.

EXAMPLE 2

A charge receiver is prepared as described in Example 1 except that the oxide layer is zirconium oxide material having the following characteristics: 92–94% zirconium oxide ($ZrO_2$); hardness (Rockwell): Rn15 74–75; bond strength (psi) 1950 tapered, 6970 cylindrical; density (g/cc): 5.32 (apparent), 5.01 (bulk); surface finish (rms, microinches): 130–160 (sprayed), 10–15 (ground); melting point: 4874 F.

EXAMPLE 3

A charge receiver is prepared as described in Example 1 except that the oxide layer is a mixture of aluminum oxide and titanium oxide ($TiO_2$) having the following characteristics: 87% aluminum oxide; 13% titanium oxide; hardness (Rockwell): Rc 60–65; bond strength (psi) 2250 tapered; density (g/cc): 3.50; surface finish (rms, microinches): 250–350 (sprayed), 10–20 (ground); melting point: 3340 F.

EXAMPLE 4

A charge receiver is prepared using the aluminum oxide material described in Example 1. However, a polyester (Corvel 23000, commercially available from Morton Thiokol) is sprayed along with the aluminum oxide material.

What is claimed is:

1. A dielectric image receiving member comprising:

a substrate layer having a substrate surface;

a porous plasma-sprayed dielectric layer formed on said surface, said porous plasma-sprayed dielectric layer having a porous surface with a number of pores, at least some of said pores opening at said porous surface, said porous plasma-sprayed dielectric layer having a thickness ranging from about 0.001 inch to about 0.015 inch and a thickness variation of less than about ±5%; and a durable dielectric polymeric coating material filling substantially all said pores opening at said porous surface and defining a polymeric surface thereon to provide a voltage uniformity of better than about ±5% such that the voltage measured at any point on said polymeric surface is no more than about ±5% greater or less than the voltage measured at any other point on said polymeric surface.

2. The dielectric image receiving member of claim 1 wherein the durable dielectric polymeric coating material fills pores throughout the plasma-sprayed layer.

3. The dielectric image receiving member of claim 1 wherein the durable dielectric polymeric coating material fills pores opening at the surface of the plasma sprayed layer.

4. The dielectric image receiving member of claim 1 wherein the plasma-sprayed dielectric layer comprises a metal oxide.

5. The dielectric image receiving member of claim 4 wherein the metal oxide is selected from the group consisting of aluminum oxide, zirconium oxide, titanium oxide and mixtures thereof.

6. The dielectric image receiving member of claim 4 wherein the metal oxide is aluminum oxide.

7. The dielectric image receiving member of claim 4 wherein the metal oxide is a mixture of oxides of different metals.

8. The dielectric image receiving member of claim 4 wherein the metal oxide is a mixture of aluminum oxide and an oxide of at least one other metal.

9. The dielectric image receiving member of claim 4 wherein the dielectric polymeric coating material is plasma-sprayed with the metal oxide.

10. The dielectric image receiving member of claim 1 wherein said porous plasma-sprayed dielectric layer is a metal oxide having a bulk electrical resistivity of at least $10^{11}$ ohm-cm.

11. The dielectric image receiving member of claim 1 wherein the porous plasma-sprayed dielectric layer comprises a material selected from the group consisting of $Y_2O_3$, BN, $Si_3N_4$, $CeO_2$, $ZrSiO_4$, MgO, $TiB_2$, $HfO_2$, $Sm_2O_3$, $MoSi_2$, SiC, and mixtures thereof.

12. The dielectric image receiving member of claim 1 wherein the dielectric polymeric coating material is selected from the group consisting of a polyester, an acrylic, a silicone, a polyimide, and a glass resin.

13. The dielectric image receiving member of claim 1 wherein the dielectric polymeric coating material is a glass resin.

14. The dielectric image receiving member of claim 1 wherein the dielectric polymeric coating material is selected from the group consisting of polyurethanes, polyesters, fluorocarbon polymers, polycarbonates, polyarylethers, polyaryl sulfones, polybutadiene and copolymers of styrene, vinyl/toluene, acrylates, polyether sulfones, polyimides, poly(amide-imides), polyetherimides, polystyrene and acrylonitrile copolymers, alkyds, cellulosic resins and polymers, nylon and other polyamides, phenolic resins, phenylene oxide, polyvinylidene fluoride, polyvinylfluoride, polybutylene and polycarbonate co-esters.

15. The dielectric image receiving member of claim 1 wherein the dielectric polymeric coating material is selected from the group consisting of silicone-silica hybrid polymers, dispersions of colloidal silica and hydroxylated silesquixone in alcoholic media, cross-linked siloxanol-colloidal silica hybrid materials, and glass resins.

16. The dielectric image receiving member of claim 1 wherein said thickness variation is less than ±2% and said voltage uniformity is better than ±2%.

17. The dielectric image receiving member of claim 1 wherein said dielectric image receiving member has a surface resistivity of at least $10^8$ ohms/square.

* * * * *